United States Patent
Kielstra et al.

(10) Patent No.: US 10,248,554 B2
(45) Date of Patent: Apr. 2, 2019

(54) EMBEDDING PROFILE TESTS INTO PROFILE DRIVEN FEEDBACK GENERATED BINARIES

(71) Applicant: International Business Machines Corporation, Armonk, NY (US)

(72) Inventors: Allan H. Kielstra, Ontario (CA); Ramy Shahin, North York (CA); David K. Siegwart, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/350,203

(22) Filed: Nov. 14, 2016

(65) Prior Publication Data

US 2018/0137039 A1    May 17, 2018

(51) Int. Cl.
   *G06F 9/44*    (2018.01)
   *G06F 11/36*   (2006.01)
   *G06F 8/41*    (2018.01)

(52) U.S. Cl.
   CPC .......... *G06F 11/3688* (2013.01); *G06F 8/443* (2013.01); *G06F 11/3672* (2013.01); *G06F 11/3684* (2013.01)

(58) Field of Classification Search
   None
   See application file for complete search history.

(56) References Cited

U.S. PATENT DOCUMENTS

| 7,287,173 B2 | 10/2007 | Hsieh |
| 2007/0204260 A1* | 8/2007 | Ishizuka ............... G06F 8/443 717/162 |
| 2011/0312518 A1 | 12/2011 | Davis et al. |

(Continued)

FOREIGN PATENT DOCUMENTS

| CN | 100370432 C | 2/2008 |
| CN | 104375941 A | 2/2015 |
| WO | 2017/162058 A1 | 9/2017 |

OTHER PUBLICATIONS

Lo, Shih-Jie, et al.; "Get to understand More from Single-Cells: Current Studies of Microfluidic-Based Techniques for Single-Cell Analysis"; International Journal of Molecular Sciences; 2015; vol. 16; 16763-16777 pages.

(Continued)

*Primary Examiner* — Daxin Wu
(74) *Attorney, Agent, or Firm* — Cantor Colburn LLP; William Kinnaman

(57) ABSTRACT

Aspects of the present invention include a method, system and computer program product that embeds collected profiling test case information into a binary file of a computer program and subsequently recompiles the program. The method includes a processor specifying one or more test cases to be embedded into a compiled binary file, wherein the one or more test cases relate to at least a portion of a computer program representing a compilation unit; executing the one or more embedded test cases under the computer program; gathering performance data associated with the computer program as the one or more embedded test cases are executed; recompiling the compilation unit based on the performance data; and linking the computer program based on the performance data.

15 Claims, 4 Drawing Sheets

(56) References Cited

U.S. PATENT DOCUMENTS

| | | | | |
|---|---|---|---|---|
| 2012/0022832 A1* | 1/2012 | Shannon | ............... | G06F 11/348 |
| | | | | 702/189 |
| 2012/0311551 A1* | 12/2012 | Johnson | ................ | G06F 8/4442 |
| | | | | 717/153 |
| 2013/0157283 A1 | 6/2013 | Yung et al. | | |
| 2014/0122043 A1* | 5/2014 | Bellamy | ............. | G06F 11/3684 |
| | | | | 703/6 |
| 2014/0298307 A1 | 10/2014 | Johnson et al. | | |
| 2015/0186253 A1* | 7/2015 | Abraham | ............ | G06F 11/3688 |
| | | | | 717/124 |
| 2017/0344349 A1* | 11/2017 | He | .......................... | G06F 8/443 |

OTHER PUBLICATIONS

Price, Alexander, K.; "Microfluidic Bead Suspension Hopper"; Analytical Chemistry; 2014; vol. 86; 5039-5044 pages.

\* cited by examiner

EMBEDDING PROFILE TESTS INTO PROFILE DRIVEN FEEDBACK GENERATED BINARIES

BACKGROUND

The present invention relates to software or computer programs, and more specifically, to methods, systems and computer program products that embed collected profiling test case information into a binary file of a computer program and subsequently recompile the program.

Profile driven feedback (PDF) is a software compiler feedback optimization technique that allows users of compiler type software programs to provide the compiler optimizer with sample program execution context information that oftentimes improves optimization quality (i.e., program runtime performance). Profiling typically refers to collecting information about the operational behavior of a compiler type of computer program (e.g., C++, Fortran) during a profiling or data gathering stage while the program is being run. The collected information typically comprises data which best represents common usage scenarios of the program (e.g., areas of the program that are executed more often than other areas of the program). The collected information is then used to improve the optimization of the program for future executions of the program during normal runtime execution (e.g., by a customer). In the profiling stage, program performance is measured while running one or more benchmarks that are representative of the way the program will be used in actual practice (e.g., by a customer).

Typically, a test case representing an expected execution context is used to drive the program, and profile information is collected and then fed back into the compiler optimizer. The compiler then recompiles the program taking into consideration (and taking advantage of) the profile information previously collected. This information typically includes histograms for basic blocks executed and branches taken by the program. Execution hot spots can be easily inferred using the histograms, which might guide several compiler optimization decisions at the recompilation phase.

However, profile driven feedback typically involves user intervention. For example, the user has to specify which tests are to run to generate the profile information. The user also has to run those tests, and then point the compiler to the generated profile information for the optimization stage to start. Also, the tests might be modified either intentionally or accidentally, resulting in different profiles and eventually different PDF-optimized binary files ("binaries"). This lack of determinism might cause several debugging and maintenance issues throughout the lifetime of a project.

SUMMARY

According to one or more embodiments of the present invention, a computer-implemented method includes specifying, by a processor, one or more test cases to be embedded into a compiled binary file, wherein the one or more test cases relate to at least a portion of a computer program representing a compilation unit; executing, by the processor, the one or more embedded test cases under the computer program; and gathering, by the processor, performance data associated with the computer program as the one or more embedded test cases are executed. The method also includes recompiling, by the processor, the compilation unit based on the performance data; and linking, by the processor, the computer program based on the performance data.

According to another embodiment of the present invention, a system includes a processor in communication with one or more types of memory, the processor configured to specify one or more test cases to be embedded into a compiled binary file, wherein the one or more test cases relate to at least a portion of a computer program representing a compilation unit; to execute the one or more embedded test cases under the computer program; and to gather performance data associated with the computer program as the one or more embedded test cases are executed. The processor is also configured to recompile the compilation unit based on the performance data; and to link the computer program based on the performance data.

According to yet another embodiment of the present invention, a computer program product includes a non-transitory storage medium readable by a processing circuit and storing instructions for execution by the processing circuit for performing a method that includes specifying one or more test cases to be embedded into a compiled binary file, wherein the one or more test cases relate to at least a portion of a computer program representing a compilation unit; executing the one or more embedded test cases under the computer program; and gathering performance data associated with the computer program as the one or more embedded test cases are executed. The method also includes recompiling the compilation unit based on the performance data; and linking the computer program based on the performance data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
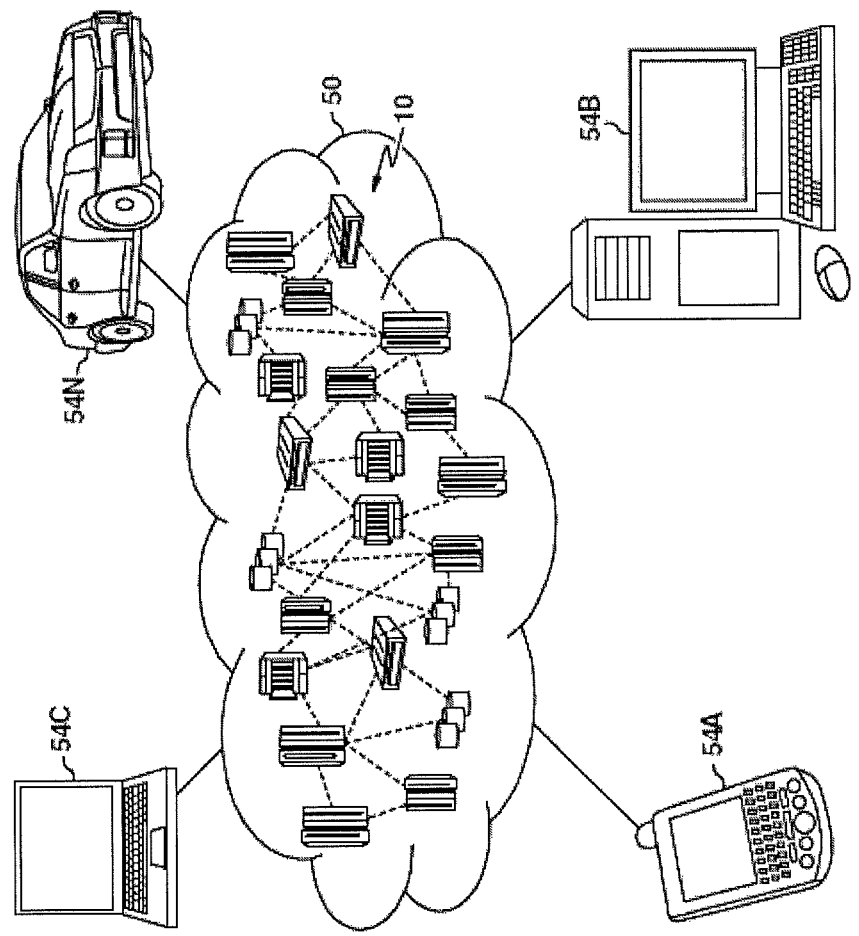
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
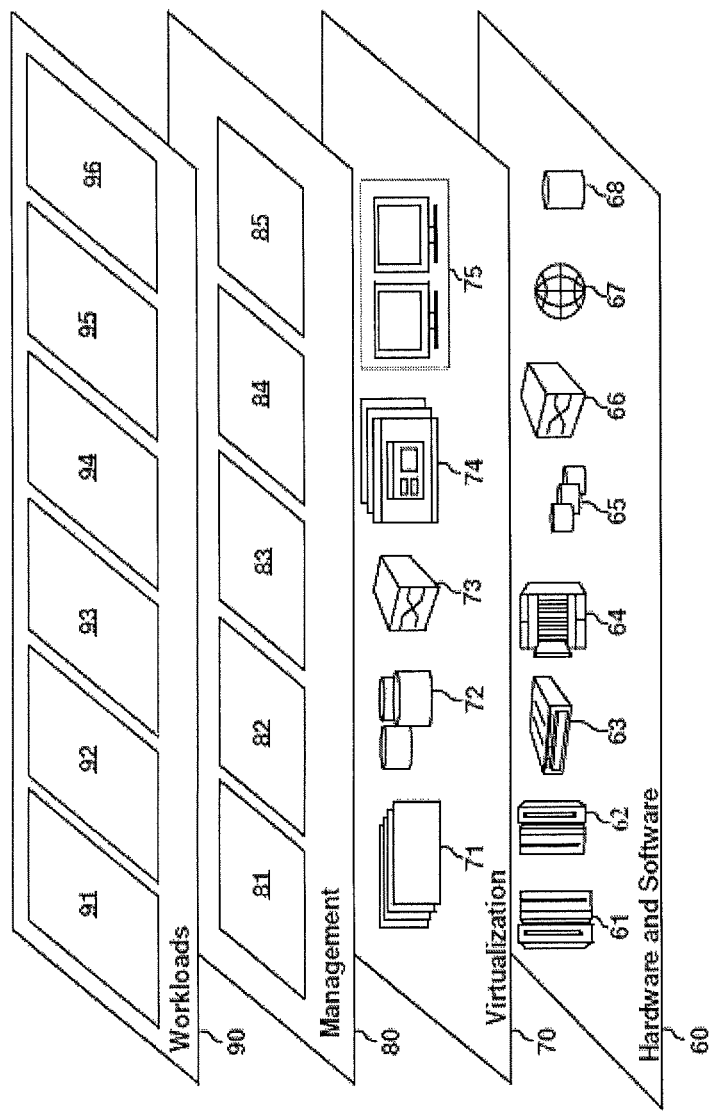
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for embedding collected profiling test case information into a binary file of a computer program and subsequently recompiling the program in accordance with one or more embodiments of the present invention.

Figure 3:
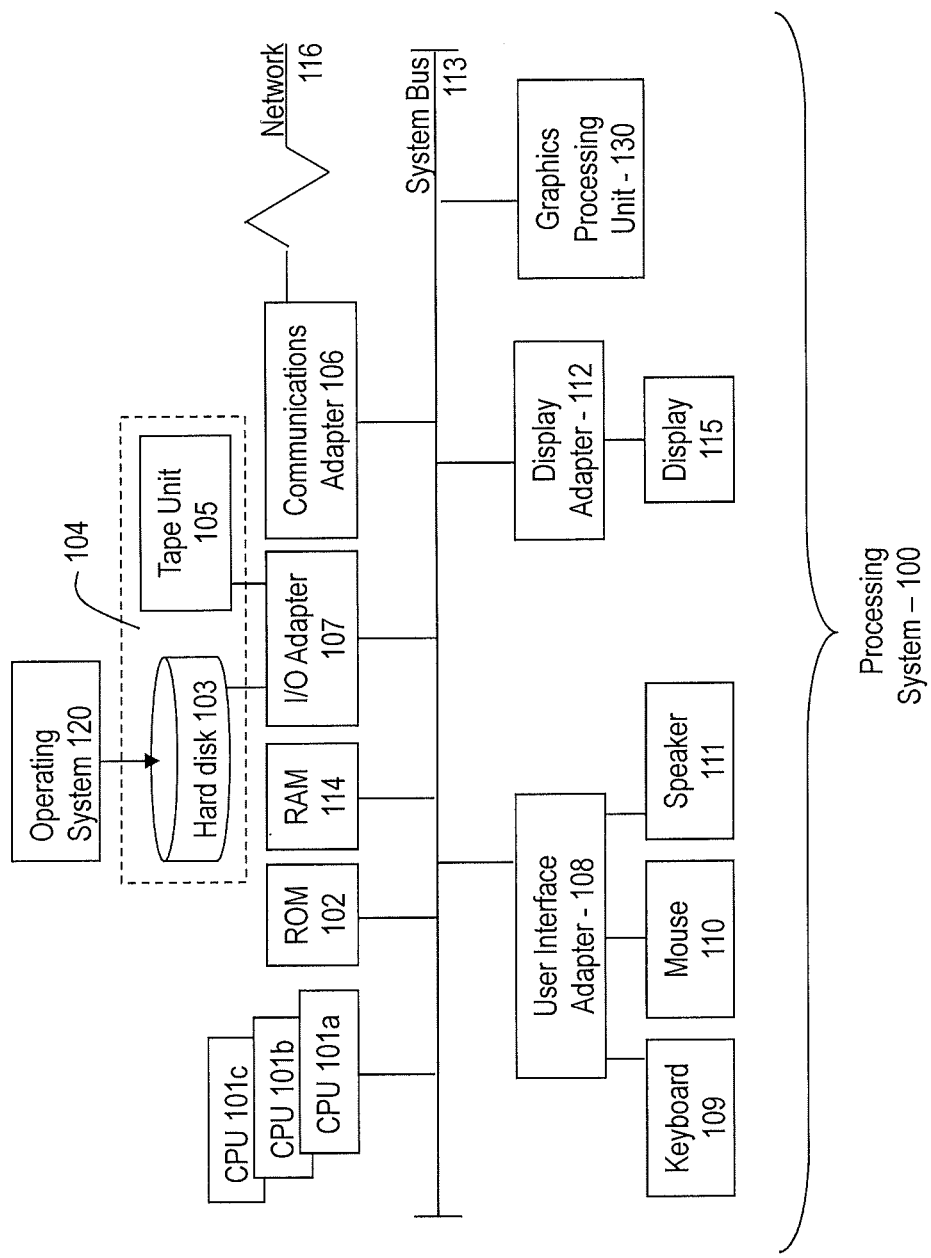
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. Hard disk 103 and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for embedding collected profiling test case information into a binary file of a computer program and subsequently recompiling the program.

Embodiments of the present invention embed or store one or more test cases into a binary file generated by a PDF compiler. As mentioned hereinabove, a test case representing an expected execution context of a software (computer) program is used to drive the program, and profile information is collected and then fed back into the compiler optimizer. The compiler then recompiles the program taking into consideration (and taking advantage of) the profile information previously collected. This collected profiled information typically includes, for example, histograms for basic blocks executed and branches taken by the program. The one or more test cases associated with the binary file can then be used as a part of the recompilation process, making the PDF compilation process fully automated. In addition, whenever the particular software or computer program is recompiled, the same test case can be used in the profiling phase, resulting in a relatively consistent execution context and more accurate profile information.

The embedded test cases are typically fully executable on the computer system where the compilation takes place. The test cases may include, for example and without limitation, shell scripts, input data sets, output comparison validation data sets, references to other programs and/or libraries stored on the computer system, and actual executable test programs. Also the granularity of a test case may vary from unit test cases for particular compilation units to integration tests for entire programs. The compilation units covered by a particular test case may be specified when embedding the test case. A compilation unit may be considered to comprise a particular portion of the software or computer program code. Also, whenever any of the compilation units are recompiled and linked, that particular test case is re-executed.

If a test case covers a single compilation unit, then the test case is embedded in the compiled binary file of that compilation unit as a part of the compilation phase. However, if a test case covers several compilation units, the test case is embedded into the linked binary file as a part of the link phase. The test cases embedded in a binary file may be removed or replaced by "newer" test cases whenever a binary file is regenerated (e.g., either when recompiled or relinked).

Figure 4:
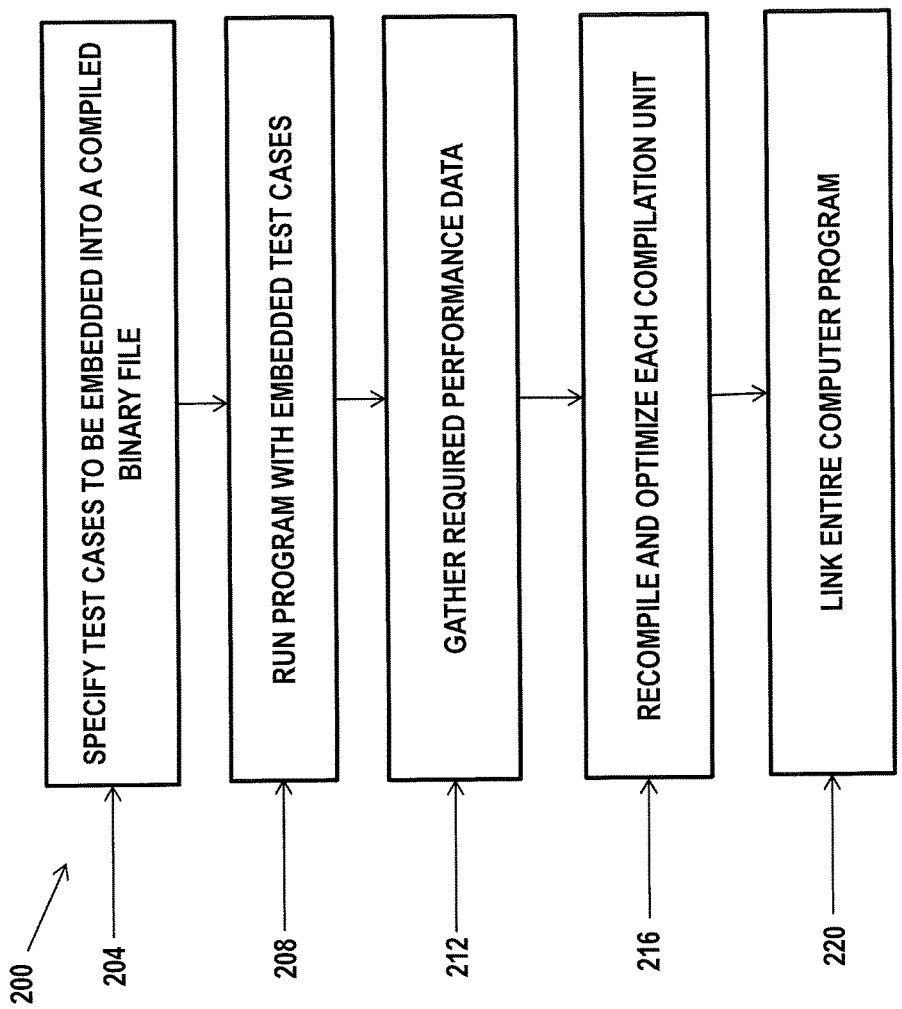
FIG. 4 is a flow diagram of a method for embedding collected profiling test case information into a binary file of a computer program and subsequently recompiling the program in accordance with one or more embodiments of the present invention.

With reference now to FIG. 4, a flow diagram illustrates a method 200 according to one or more embodiments of the present invention for embedding collected profiling test case information into a binary file of a computer program and subsequently recompiling the program.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

In the method 200 of FIG. 4, in an operation in block 204, as part of the compilation process for a particular portion of software or computer program code representing a compilation unit, the user may specify one or more test cases to be embedded into a compiled binary file. Each test case comprises a set of files together with a test invocation command for each test case. The metadata of the compiled binary file may keep track of the association between the test cases and the compilation unit.

Similarly, as a part of the link process, the user can specify similar test cases that are to be associated with the linked binary file. Again, the metadata of the compiled binary file may track this association between the test cases and the compilation unit.

In an operation in block 208, as part of the PDF process, the one or more embedded test cases are executed under a profiling program (i.e., the computer program is run). Then in an operation in block 212, the required performance data of the computer program is gathered.

Next, in an operation in block 216, using the gathered performance data, each of the one or more individual compilation units are recompiled and optimized, and then the entire program is linked again in an operation in block 220.

According to embodiments of the present invention, whenever a compilation unit is modified and recompiled, its corresponding test cases may be re-executed again. Thus, the method 200 of FIG. 4 may be re-executed. This is done to both catch any regressions and to gather PDF information. Since the test cases are already included in the binary files, the entire process can be fully automated involving no user intervention, in accordance with embodiments of the present invention.

The test environment may only be temporary for the duration of running test cases, and may be fully deleted at the end of the test case run process. This ensures that none of the data associated with the test cases is leaked out, especially on a multi-user system. This also ensures that only test cases covering one or more modified compilation units are those that are re-launched as part of the compilation process. More specifically, when one or more compilation units are modified, recompiled and linked, the test cases covering the modified compilation units are the ones to be re-launched as part of the process. For example, when compilation unit A changes, then compilation unit A is recompiled. The program is then relinked, and possible test cases for compilation unit A are sought, and the selected test cases are executed. Compilation unit A is automatically recompiled. This process can be driven by the relink.

One may observe that new versions of compilation units A and B are linked but not compilation unit C. Thus, one can run appropriate tests for compilation units A and B only and automatically recompile only compilation units A and B (and then relink them again).

Embodiments of the present invention represent improvements in the relevant art of software compilers. For example, profile driven feedback (PDF) typically involves user intervention in which the user has to specify which test cases are to run to generate the profile information. The user then runs those test cases, and points the compiler to the generated profile information for the optimization stage to start. However, embodiments of the present invention allow the user to specify the test case(s) only once when the program is first compiled. The test cases are then embedded into the binary file generated by the compiler. As such, the test cases are then automatically used in subsequent compilations whenever the program is modified and recompiled.

Also, the test cases may be modified either intentionally or accidentally, resulting in undesirable different profiles and eventually different PDF optimized binary files. This lack of determinism may cause several debugging and maintenance issues throughout the lifetime of a project. However, embodiments of the present invention pair a fixed test case (or a set of test cases) with a particular software program from the beginning. This results in the same test case being used for subsequent PDF compilations. Also, the binary file generated by the compiler is deterministic with respect to the input program and the specified compilation options.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   specifying, by a processor, one or more test cases to be embedded into a compiled binary file, wherein the one or more test cases relate to at least a portion of a computer program representing a compilation unit and further wherein the compiled binary file is generated by a profile driven feedback compiler;
   executing, by the processor, the one or more embedded test cases under the computer program;
   gathering, by the processor, performance data associated with the computer program as the one or more embedded test cases are executed, wherein the gathered performance data associated with the computer program includes histograms for basic blocks executed and branches taken by the computer program;
   recompiling, by the processor, the compilation unit based on the performance data; and
   linking, by the processor, the computer program based on the performance data.

2. The computer-implemented method of claim 1 wherein each of the one or more test cases comprises a set of files and a test invocation command.

3. The computer-implemented method of claim 1 further comprising tracking, by the processor, an association between the one or more test cases and the compilation unit through use of metadata of the compiled binary file.

4. The computer-implemented method of claim 1 wherein linking, by the processor, the computer program based on the performance data comprises specifying, by the processor, one or more additional test cases and associating, by the processor, the one or more additional test cases to a linked binary file.

5. The computer-implemented method of claim 1 wherein each of the one or more test cases represents an expected execution content of the computer program.

6. A system comprising:
   a processor in communication with one or more types of memory, the processor configured to:
      specify, by a processor, one or more test cases to be embedded into a compiled binary file, wherein the one or more test cases relate to at least a portion of a computer program representing a compilation unit and further wherein the compiled binary file is generated by a profile driven feedback compiler;
      execute, by the processor, the one or more embedded test cases under the computer program;
      gather, by the processor, performance data associated with the computer program as the one or more embedded test cases are executed, wherein the gathered performance data associated with the computer program includes histograms for basic blocks executed and branches taken by the computer program;
      recompile the compilation unit based on the performance data; and
      link the computer program based on the performance data.

7. The system of claim 6 wherein each of the one or more test cases comprises a set of files and a test invocation command.

8. The system of claim 6 wherein the processor is further configured to track an association between the one or more test cases and the compilation unit through use of metadata of the compiled binary file.

9. The system of claim 6 wherein the processor configured to link the computer program based on the performance data comprises the processor configured to specify one or more additional test cases and to associate the one or more additional test cases to a linked binary file.

10. The system of claim 6 wherein each of the one or more test cases represents an expected execution content of the computer program.

11. A computer program product comprising:
    a non-transitory storage medium readable by a processing circuit and storing instructions for execution by the processing circuit for performing a method comprising:
       specifying, by a processor, one or more test cases to be embedded into a compiled binary file, wherein the one or more test cases relate to at least a portion of a computer program representing a compilation unit and further wherein the compiled binary file is generated by a profile driven feedback compiler;
       executing, by the processor, the one or more embedded test cases under the computer program;
       gathering, by the processor, performance data associated with the computer program as the one or more embedded test cases are executed, wherein the gathered performance data associated with the computer program includes histograms for basic blocks executed and branches taken by the computer program;
       recompiling the compilation unit based on the performance data; and
       linking the computer program based on the performance data.

12. The computer program product of claim 11 wherein each of the one or more test cases comprises a set of files and a test invocation command.

13. The computer program product of claim 11 further comprising tracking an association between the one or more test cases and the compilation unit through use of metadata of the compiled binary file.

14. The computer program product of claim 11 wherein linking the computer program based on the performance data comprises specifying one or more additional test cases and associating the one or more additional test cases to a linked binary file.

15. The computer program product of claim 11 wherein each of the one or more test cases represents an expected execution content of the computer program.

* * * * *